Aug. 17, 1965     C. F. JANES     3,200,668

ELECTRO-MAGNETIC ACTUATOR

Filed May 22, 1964

INVENTOR.
CHARLES F. JANES

United States Patent Office 3,200,668
Patented Aug. 17, 1965

3,200,668
ELECTRO-MAGNETIC ACTUATOR
Charles F. Janes, Alexandria, Va., assignor to the United States of America as represented by the Secretary of the Navy
Filed May 22, 1964, Ser. No. 369,648
8 Claims. (Cl. 74—640)
(Granted under Title 35, U.S. Code (1952), sec. 266)

The invention described herein may be manufactured and used by or for the Government of the United States of America for governmental purposes without the payment of any royalties thereon or therefor.

This invention relates to wave generators, and more specifically to an electro-magnetic wave generator particularly adapted for creating a rotating wave in the flexible ring gear of a harmonic drive device.

Harmonic drive devices, such as those disclosed in U.S. Patents 2,906,143; 2,929,265; 2,929,266; 2,931,248; 2,932,986; and 2,943,513 have proved to be useful for providing a high ratio speed reduction between an input and output shaft. Broadly, the harmonic drive device accomplishes speed reduction by generating a rotating wave in a flexible, externally-toothed spline, called a flexspline, to cause its teeth to engage with the teeth of an internally toothed outer spline at a desired number of points. Since the flexspline has fewer teeth than the outer spline, those teeth of the flexspline forced into engagement with the teeth of outer spline are cammed along the inclined surfaces of the outer spline teeth, thereby creating relative motion between the flexspline and outer spline. Either of the splines may be held stationary while the other is permitted to rotate relative thereto. A better understanding of the basic principles and theory relating to harmonic drive devices may be had by referring to the patents noted hereinbefore.

The wave generator for the harmonic drive devices in the above-cited patents is a disc-like member having one or more lobes thereon, and disposed concentrically within the flexspline. A high speed motor rotates input shaft which rotates the lobed disc-like member. Rotation of the disc member generates a rotating wave in the flexspline, to cause relative movement between the flexspline and outer spline.

One possible application of the harmonic drive as a speed reducer is in propelling small, deep diving research submarines. However, since the motor and input shaft would be operating in a liquid medium, high frictional losses would result. In addition, bearing failure and the other problems which accompany high speed machinery render this application of the prior art harmonic drive devices impractical.

It has been suggested that a plurality of hydraulically actuated piston-and-cylinder units be employed, in place of the rotating disc-like member, to force the teeth of the flexspline into engagement with the teeth of the outer spline. The piston-and-cylinder units would be placed in a circle within the flexspline with their longitudinal axes disposed along radii of the flexspline. The units would be sequentially actuated to generate a rotating wave to deform the flexspline. While this arrangement would eliminate the above-mentioned high frictional losses associated with the use of a high speed motor to drive the disc-like member, the use of a hydraulic system creates an additional problem, that of leakage. Leakage occurring in the hydraulic system could cause failure of the system and would be dangerous when used in a submarine.

It has also been suggested that a series of electromagnets positioned about the flexspline be employed in place of the disc like member. These electromagnets would be progressively excited to produce a rotating field, and would cooperate with magnetic materials embedded in the flexspline to radially deflect the flexspline. This arrangement is not efficient however, because of the high eddy current losses which would occur in the flexspline, and the resultant heat generated thereby.

In view of the foregoing, it is an object of the present invention to eliminate the disadvantages associated with the prior art harmonic drive wave generators, and to provide an improved wave generator which is simple and economical to construct and assemble, and efficient in operation.

It is another object of this invention to provide an improved device for generating a rotating force wave.

It is still another object of this invention to provide a harmonic drive device wherein the motor for flexing the flexspline will not be subject to frictional losses when the device is operated in a liquid medium.

It is a further object of this invention to provide a wave generator for use with a harmonic drive device which has no high speed moving parts that will create frictional losses when the harmonic drive is operated in a liquid medium.

It is a still further object of this invention to provide a wave generating apparatus for a harmonic drive which does not require the use of bearings.

Other objects and many of the attendant advantages of this invention will be readily appreciated as the same becomes better understood by reference to the following detailed description when considered in connection with the accompanying drawings wherein.

It should be understood at the outset that while the embodiment of the invention shown in FIGS. 1–4 includes eight solenoids electrically connected to produce a rotating wave having two lobes (eliptoidal shape), the circuitry and number of solenoids could be varied to produce a rotating wave of any desired configuration.

Figure 1:
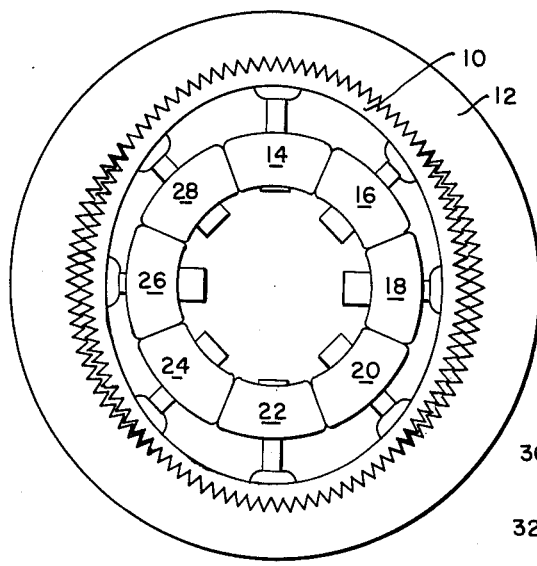
FIG. 1 shows a plan view of the wave generator of the present invention used in a harmonic drive device.

Referring now to the drawings, wherein like reference characters designate like or corresponding parts throughout the several views thereof, there is seen in FIG. 1 a harmonic drive device. The device includes a flexspline 10, and an outer spline member 12, and a plurality of electrically connected solenoids 14, 16, 18, 20, 22, 24, 26 and 28 driving the flexspline. The flexspline 10 is made of an elastic material and has teeth along its outer periphery. The outer spline member 12 has internal teeth which are greater in number than the teeth on the flexspline. The teeth on the flexspline and outer spline are forced into camming engagement when the flexspline is deformed to produce relative movement therebetween.

Figure 2:
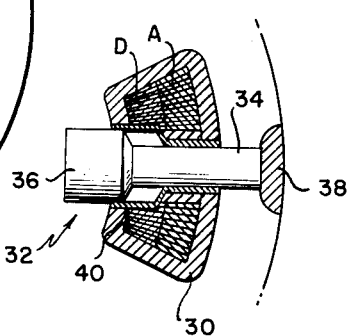
FIG. 2 illustrates a plan view, in section, of one of the solenoids of the wave generator.

As best seen in FIG. 2, each solenoid is radially oriented and includes a plunger 32, an annular casing 30, and alternating current and direct current windings A and D enclosed in the casing 30. The plunger has a core 34, an enlarged end portion 36, and a head portion 38. A non-magnetic sleeve 40 is employed to magnetically insulate the plunger from the casing 30.

When A.C. current flows through the A.C. winding of a solenoid, a flux will be created which will urge the plunger into the center or equilibrium position in the windings. When the plunger is so centered in the winding, it is in extended position and exerts a force against the flexspline to deform the same. As the current in the winding decreases, the flux decreases to zero, and the flexspline forces the plunger back to its retracted position. As the A.C. current passes through zero on the second half of its cycle, flux again builds up in the gap between the windings which again forces the plunger to its equilibrium position in the winding to deform the flexspline. Thus, if only an A.C. winding was employed, for every cycle of A.C. current the plunger would reciprocate twice to deform the flexspline.

In order to cause the plunger to reciprocate only once for each cycle of A.C. current, a D.C. winding may also be employed in each solenoid. The D.C. winding maintains a flux in the solenoid which is equal in magnitude and polarity to the flux created by the A.C. current on the first half of its cycle, and equal but opposite in polarity to the flux created by the A.C. current on the second half of its cycle. Thus, during half of the A.C. current cycle the A.C. and D.C. created flux cancel one another so that the plunger remains in its retracted position.

Figure 3:
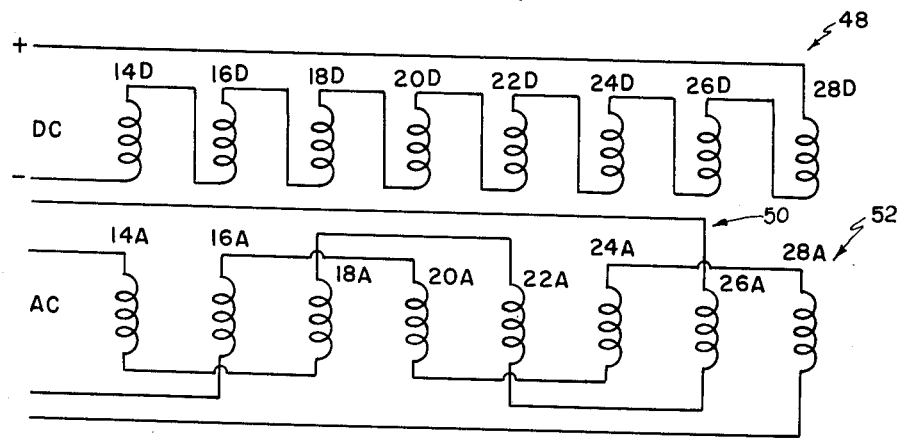
FIG. 3 shows in schematic form, the circuitry connected between the solenoids.

FIG. 3 shows the circuitry employed to produce a two-lobed rotating wave in the flexspline. Alternating current circuits 50 and 52 are connected between the A.C. windings of the solenoids to selectively send A.C. current through the windings. In order to energize the solenoids 14-28 in a sequential fashion, A.C. windings 14A, 18A, 22A, and 26A are connected in series in circuit 50, while windings 16A, 20A, 24A, and 28A are connected in series in circuit 52. The windings in circuit 50 are so wound that when current is flowing in one direction through windings 14A and 22A, it is flowing in the opposite direction in windings 18A and 26A. Similarly, in circuit 52, current flows through windings 16A and 24A in one direction while it is flowing through windings 20 and 28A in the opposite direction.

Power supply means (not shown) are connected to each of circuits 50 and 52 to generate electrical waves which are 90 degrees out of phase. These power supply means may be, for example, rotary generators or static inverters. The waves need not necessarily be sinusoidal, of course.

Figure 4:
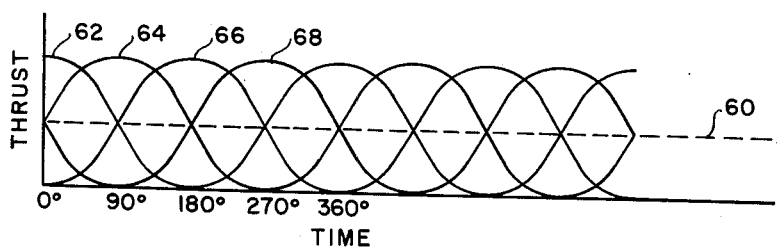
FIG. 4 is a graph for illustrating the performance characteristics of the wave generator.

The graph of FIG. 4 shows a plot of the value of the radially outward resultant thrust on each of the plungers of the solenoids at a given time (expressed in degrees). It should be understood that the resultant thrust on each plunger is directly proportional to the flux created in each solenoid, which, in turn, is proportional to the ampere-turns of the coils of the solenoid. Curve 60 in FIG. 4 indicates the magnitude of the radially outward thrust created by the D.C. windings 14D-28D, herein after referred to as the D.C. bias. Curves 62, 64, 66, and 68 indicate the magnitude of the radially outward thrust on the plungers in solenoids 14 and 22, 16 and 24, 18 and 26, and 20 and 28, respectively. As is evident in FIG. 4, when the thrust on the plungers 34 in solenoids 14 and 22 is a maximum, the thrust on the plungers in solenoids 18 and 26 is zero, and the thrust on the plungers 16, 20, 24, and 28 is substantially equal to the thrust created by the D.C. bias. When the thrust is a maximum in the solenoids 16 and 24, the thrust will be zero in solenoids 20 and 28, and so on around the circle formed by the solenoids. Thus the solenoids in this embodiment generate a rotating elliptical or nearly elliptical wave, urging the teeth on two diametrically opposed portions of the flexspline 10 into camming engagement with the internally disposed teeth on the outer spline member 12. This will cause relative movement between the flexspline and the outer spline member.

While the embodiment described hereinabove produces a two-lobed rotating wave in the flexspline, a wave having any desired number of lobes may be generated by varying the phase angle between the A.C. windings of successive solenoids, and the number of solenoids.

As is evident from the foregoing, the present invention provides an improved rotating wave generator, particularly adapted for driving the flexspline of a harmonic drive device.

Obviously many modifications and variations of the present invention are possible in the light of the above teachings. It is therefore to be understood that within the scope of the appended claims the invention may be practiced otherwise than as specifically described.

What is claimed is:
1. A rotating wave generator comprising:
 a plurality of solenoids;
 each of said solenoids including a plunger;
 said solenoids being arranged in a circle with the longitudinal axes of the plungers lying on radii of the circle; and
 means connected to said solenoids for generating electrical waves to energize selected ones of said solenoids in a desired sequence; whereby, the plungers of said solenoids will reciprocate in a predetermined sequential fashion.
2. A rotating wave generator according to claim 1, wherein said means for generating electrical waves includes an alternating current generator connected to windings of the solenoids.
3. A rotating wave generator according to claim 1, wherein:
 each of said solenoids includes first and second windings; and
 said means for generating electrical waves includes:
  direct current generator means connected to said first winding of each solenoid for maintaining a direct current bias on said solenoid; and
  alternating current generator means connected to said second winding of each solenoid for causing each said plunger to reciprocate.
4. A motion transmitting device, comprising:
 an outer ring gear having teeth formed along its inner peripheral edge;
 a deformable inner ring gear concentrically disposed within said outer ring gear, and having teeth formed along its outer peripheral edge which are fewer in number than the teeth on the outer ring gear;
 a plurality of solenoids disposed within said inner ring gear for generating a rotating wave therein;
 each of said solenoids including a plunger;
 said solenoids being arranged in a circle in the inner ring gear with the plungers of the solenoids lying on radii of the circle; and
 means connected to said solenoids for generating electrical waves to energize selected ones of said solenoids in a predetermined sequence;
 whereby, the plungers of said solenoids will reciprocate in a predetermined sequential fashion to generate a rotating wave in said inner ring gear, to force the teeth on the inner and outer ring gears into camming engagement with each other to cause relative rotating movement between the inner and outer ring gears.
5. A motion transmitting device according to claim 4, wherein said means for generating electrical waves includes an alternating current generator connected to windings of the solenoids.
6. A motion transmitting device according to claim 4, wherein:
 each of said solenoids includes first and second windings; and
 said means for generating electrical waves includes:
  direct current generator means connected to said first winding of each solenoid for maintaining a direct current bias on said solenoid; and
  alternating current generator means connected to said second winding of each solenoid for causing each said plunger to reciprocate..

7. A motion transmitting device according to claim 6, wherein the number of said solenoids is an even integer.

8. A motion transmitting device according to claim 7, wherein alternate ones of said windings which are connected to said alternating current generator means are connected in series and wound successively in opposite directions, and the remaining ones of said windings which are connected to said alternating current generator means are connected in series and wound successively in opposite directions; whereby, diametrically opposed solenoids will be energized at the same time to produce a rotating wave having two lobes.

References Cited by the Examiner

UNITED STATES PATENTS

| | | | |
|---|---|---|---|
| 2,579,983 | 12/51 | Thornton | 317—139 X |
| 2,906,143 | 9/59 | Musser | 74—640 |
| 3,169,201 | 2/65 | Spring et al. | 74—640 X |

DON A. WAITE, *Primary Examiner.*